United States Patent

Buran et al.

[15] 3,638,489
[45] Feb. 1, 1972

[54] STABLE IONIZATION-TYPE ANEMOMETER HAVING AN OPTIMALLY ADJUSTABLE MEASUREMENT RANGE

[72] Inventors: Vojtech Buran, Brno; Jaromir Kuba, Troubsko Ubrna; Adolf Uncovsky; Karel Zouhar, both of Brno, all of Czechoslovakia

[73] Assignee: Vyzkumny a vyvojovy ustav Zavodu vseobecneho strojirenstvi, Brno, Czechoslovakia

[22] Filed: Oct. 13, 1969

[21] Appl. No.: 865,901

[52] U.S. Cl. ............................................. 73/194 E, 73/3
[51] Int. Cl. ............................................. G01f 1/00
[58] Field of Search .............. 73/194, 194 E, 194 F, 1 R, 73/3; 323/75 E; 324/65 B, 33; 307/304; 330/30 D, 38 R

[56] References Cited

UNITED STATES PATENTS

| 2,516,520 | 7/1950 | Lamport et al. | 324/130 UX |
| 2,613,235 | 10/1952 | Grunsky | 324/130 UX |
| 3,431,508 | 3/1969 | Soltz et al. | 324/30 UX |
| 1,411,796 | 4/1922 | Meyer | 73/194 |
| 2,627,543 | 2/1953 | Obermaier | 73/194 |
| 3,114,867 | 12/1963 | Szekely | 317/235 |
| 3,520,190 | 7/1970 | Paine | 73/382 |

*Primary Examiner*—Charles A. Ruehl
*Attorney*—Arthur O. Klein

[57] ABSTRACT

A gas whose velocity is to be measured is passed through an ionization tube, and a first voltage proportional to the resulting ionization current is applied to one of two measurement arms of a bridge. A second voltage equal in magnitude to the first voltage when the velocity of the gas through the tube is zero is applied to a second arm of the bridge to set a zero reference on an ionization current meter connected between corresponding points on the measuring arms. The meter is then adjusted for full-scale deflection when the first voltage is reduced to zero to set the upper limit of the measuring range. The ionization current read on the meter during actual gas flow will now be accurately indicative of the flow velocity irrespective of the density and composition of the gas.

4 Claims, 1 Drawing Figure

PATENTED FEB 1 1972
3,638,489
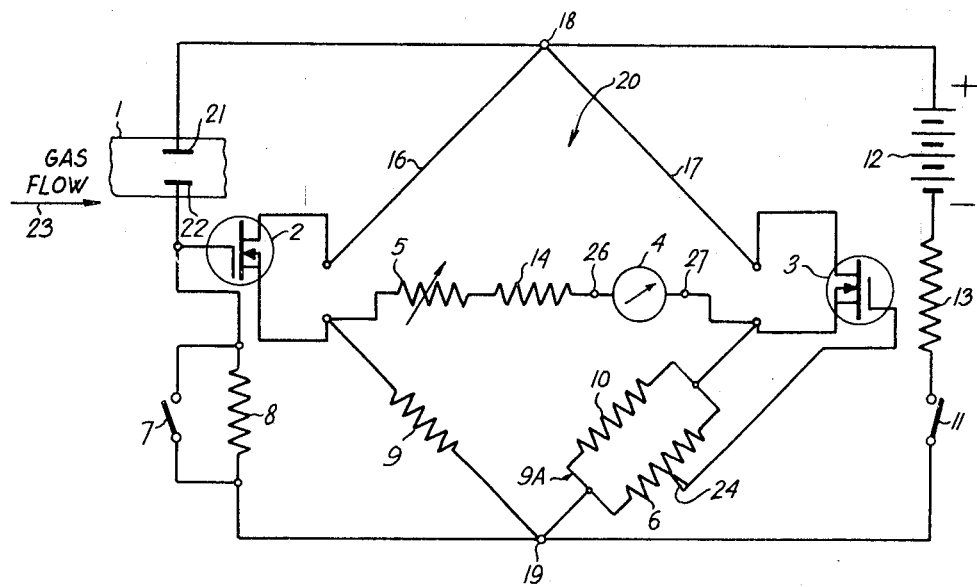
INVENTORS:
VOJTECH BURAN, JAROMIR KUBA, ADOLF UNCOVSKY AND
KAREL ZOUHAR
BY: ATTORNEY

STABLE IONIZATION-TYPE ANEMOMETER HAVING AN OPTIMALLY ADJUSTABLE MEASUREMENT RANGE

BACKGROUND OF THE INVENTION

It is well known that in mines, chemical plants, and other explosion-susceptible areas, the measurement of velocity of gas flow with the use of an anemometer is extremely important in the detection of potentially dangerous leakage and the like. Ideally, such an anemometer must not only be rugged and explosiveproof, but must also (a) be capable of handling wide gas velocity ranges; (b) have adequate sensitivity to detect a minute velocity of gas flow (e.g., below 50 centimeters per second); and (c) have long-term stability to assure repeatability of results.

The only known type of anemometer which theoretically meets all of the above requirements employs artificial ionization of the flowing gas, wherein the amplitude of the resulting ionization current is indicative of the gas velocity.

Unfortunately, it has been disadvantageous to employ such ionization apparatus to measure gas flow under actual field conditions for several reasons. For example, until now the desired long-term stability has only been obtained when the ionization apparatus is energized either by a well-regulated power supply connected to fixed AC mains or by large and bulky batteries of high capacity. Such expedients are obviously incompatible with field environments (such as mines) which dictate that the anemometer be lightweight and portable. Moreover, it has been found that the amplitude of ionization current flow in such apparatus is intolerably dependent on ambient temperature and on the density and composition of the flowing gas, so that separate measurement scales have been required for separate applications.

SUMMARY OF THE INVENTION

The above disadvantages are overcome in the ionization-type anemometer of the present invention, which includes a relatively lightweight, single-scale arrangement for measuring currents indicative of the velocity of flow of an ionizable gas in a manner substantially independent of variations of temperature or gas properties. The gas to be measured is directed through an ionization tube whose current output is inversely proportional to the gas-flow velocity therethrough. A first voltage proportional to the output current of the ionization tube is applied to the control gate of a first one pair of field-effect transistors, whose source-drain paths are respectively serially coupled in a pair of parallel measuring arms of a bridge that may be energized by an ordinary "B" battery. The control gate of the second transistor is adjusted, via a potentiometer connected in the associated measuring arm, to a value equal to the first voltage when the gas flow velocity through the ionization tube is zero. A two-terminal current meter connected between corresponding points in the source-drain paths of the respective transistors is nulled out under these conditions to provide a zero reference on the meter. After the zero reference is set, the first voltage is intentionally reduced to zero, and the meter is adjusted for maximum deflection to establish the upper limit of the measurement range.

With this arrangement, variations in ambient temperature and of the bridge energizing voltage are minimized by the inherent balance between the bridge-measuring arms. Also, the calibration of the single measurement range on the meter in the manner described assures optimum accuracy for each type of gas to be measured whether or not its composition and density are known in advance.

BRIEF DESCRIPTION OF THE DRAWING

The nature of the invention and its advantages will appear more fully from the following detailed description taken in conjunction with the appended drawing, whose single FIGURE depicts an arrangement for measuring gas flow velocity in accordance with the invention.

DETAILED DESCRIPTION

Referring to the drawing, an improved ionization-type anemometer is depicted in schematic form. The anemometer includes a measuring bridge 20 having a pair of measurement arms 16 and 17 connected in parallel between a pair of terminals 18 and 19. The source-drain paths of a pair of nominally identical, enhancement-type, insulated-gate field-effect transistors 2 and 3 are individually coupled serially in the arms 16 and 17. The source-drain paths are energized by a common "B" battery 12 coupled across the measurement arms 16 and 17 via an on-off switch 11 and a protective resistor 13.

A fixed resistor 9 is connected in series with the source-drain path of the transistor 2, and the parallel combination (designated 9A) of a resistor 10 and the main arm of a potentiometer 6 is connected in series with the source-drain path of the transistor 3. The resistances 9 and 9A are preferably made as nearly equal as possible to facilitate bridge balance.

The null arm of the bridge includes a two-terminal current deflection meter 4 (which may have only a single scale), coupled between like points in the source-drain paths of the transistors 2 and 3 through a variable resistor 5 and a fixed resistor 14. Such like points may be the source electrodes of the respective transistors, as shown.

An ionization tube 1, which may be of any suitable type is provided with a pair of output electrodes 21 and 22 connected across the measurement arms 16 and 17 through a resistor 8 for supplying ionization current to circuitry connected thereto as described below. The resistor 8 may be selectively short-circuited by a switch 7. The ionization current developed by the tube is inversely proportional to the velocity of gas flow directed through the tube in a direction, e.g., represented by an arrow 23. The resistor 8 normally develops a test voltage proportional to the output ionization current of the tube 1. The test voltage is applied to the control gate of the transistor 2.

The control gate of the transistor 3 is energized by a variable reference voltage determined by the setting of a manually adjustable center tap 24 of the potentiometer 6.

AS will be shown, the deflection of the meter 4, which is proportional to the velocity of flow of gas through the tube 1 in a direction of the arrow 23, is essentially unaffected by temperature variations and output voltage fluctuations of the battery 12 because of the inherent balance of the measuring arms 16 and 17 under the bridge resistance and bias conditions described above. Additionally, the single measurement scale provided by the meter 4 between its zero setting and its point of maximum deflection may be optimized for any incident gas, irrespective of its composition and density, by means of the following calibration technique in accordance with the invention, so that the necessity of multiscale instruments is avoided.

The first step of such calibration procedure is to set a zero reference on the meter 4. To do this, the flow of the incident gas through the ionization tube 1 is inhibited (i.e., reduced to zero velocity) as that the tube-ionization current passing through the electrodes 21 and 22 will be at its maximum. (The absolute amplitude of such maximum will, of course, be dependent on the properties of the individual gas.) The required reduction of the gas velocity to zero may be obtained, e.g., by closing off one end of the tube 1.

Under these conditions, the relatively large ionization current flow through the electrodes 21 and 22 causes a relatively large voltage to be developed across the resistor 8, which voltage is coupled to the control gate of the transistor 2 to increase its source-drain current. The resulting change of potential across the resistor 9 is coupled through the resistors 5 and 14 to the associated terminal (designated 26) of the meter 4. The center tap 24 of the potentiometer 6 if then adjusted until a reference potential of equal amplitude is applied to the other terminal (designated 27) of the meter 4 through the source electrode of the transistor 3, as indicated by a null reading on the meter 4. At this point, the zero reference for the meter 4 is set to correspond to the zero velocity of the test gas.

After the zero reference is set to indicate a zero gas flow velocity, a maximum gas flow velocity through the tube 1 is simulated by reducing the voltage developed across the resistor 8 to zero (and thus establish a corresponding negligible voltage across the control gate of the transistor 2) by placing the shorting switch 7 in its closed position.

The reduction in voltage across the resistor 9 resulting when the voltage applied to the control gate of the transaction 2 drops to zero is coupled through the resistors 5 and 14 to the terminal 26 of the meter 4, while the reference voltage on the opposite terminal 27 remains unchanged. The current through the meter thereupon changes from its previously set null to a maximum valve. At this point, the meter 4 is adjusted for full-scale deflection by appropriately adjusting the resistor 5.

By thus calibrating the zero and full-scale indications on the meter 4 to correspond respectively to the minimum and maximum velocities of the particular gas then flowing through the tube 1, a single measurement scale on the meter is sufficient to indicate the actual flow velocity of any unknown or arbitrary gas detected by the instrument.

What is claimed is:

1. A method of establishing a measuring range on a two-terminal deflection instrument employed to measure currents indicative of the velocity of flow of an ionizable gas, which comprises the steps of:
   directing the gas through an ionization tube which provides an output current inversely proportional to the velocity of flow of the gas;
   generating a test voltage proportional to the output current of the ionization tube;
   applying the test voltage to a first terminal of the instrument;
   applying to the other terminal of the instrument a reference voltage equal to the test voltage when the velocity of the gas through the ionization tube is zero to establish a zero reference for the measuring range;
   reducing the test voltage to zero; and then adjusting the instrument for maximum deflection.

2. Apparatus for measuring a quantity indicative of the velocity of flow of an ionizable gas, which comprises:
   an ionization tube for receiving the flow of gas therethrough, the tube providing an output current inversely proportional to the velocity of flow of the gas;
   means for generating a test voltage proportional to the output current of the ionization tube;
   means for selectively short-circuiting the output of the generating means;
   a bridge circuit comprising, in combination, a pair of parallel measuring arms; a two-terminal deflection meter; first and second field-effect transistors each having a control gate and a source-drain path; a variable resistance for coupling one point in the source-drain path of the first transistor to one terminal of the meter; means for coupling a corresponding point in the source-drain path of the second transistor to the other terminal of the meter; a first resistance; a potentiometer; first means for serially connecting the source-drain path of the first transistor and the first resistance in one measuring arm; and second means for serially connecting the source-drain path of the second transistor and the main path of the potentiometer in the other measuring arm;
   means for applying the test voltage to the control gate of the first transistor; and
   means for coupling the center tap of the potentiometer to the control gate of the second transistor, the resulting current through the meter being indicative of the velocity of the gas.

3. Apparatus as defined in claim 2, further comprising, in combination, means for coupling a predetermined bias voltage across the measuring arms of the bridge, and means for serially coupling the ionization tube and the generating means across the bias-voltage-coupling means, the control gate of the first transistor being connected to the junction of the ionization tube and the generating means.

4. Apparatus as defined in claim 2, in which the first serially connecting means comprises a variable resistance.

* * * * *